Feb. 25, 1930. G. C. BISHOP 1,748,103
METAL DOOR
Filed June 27, 1927
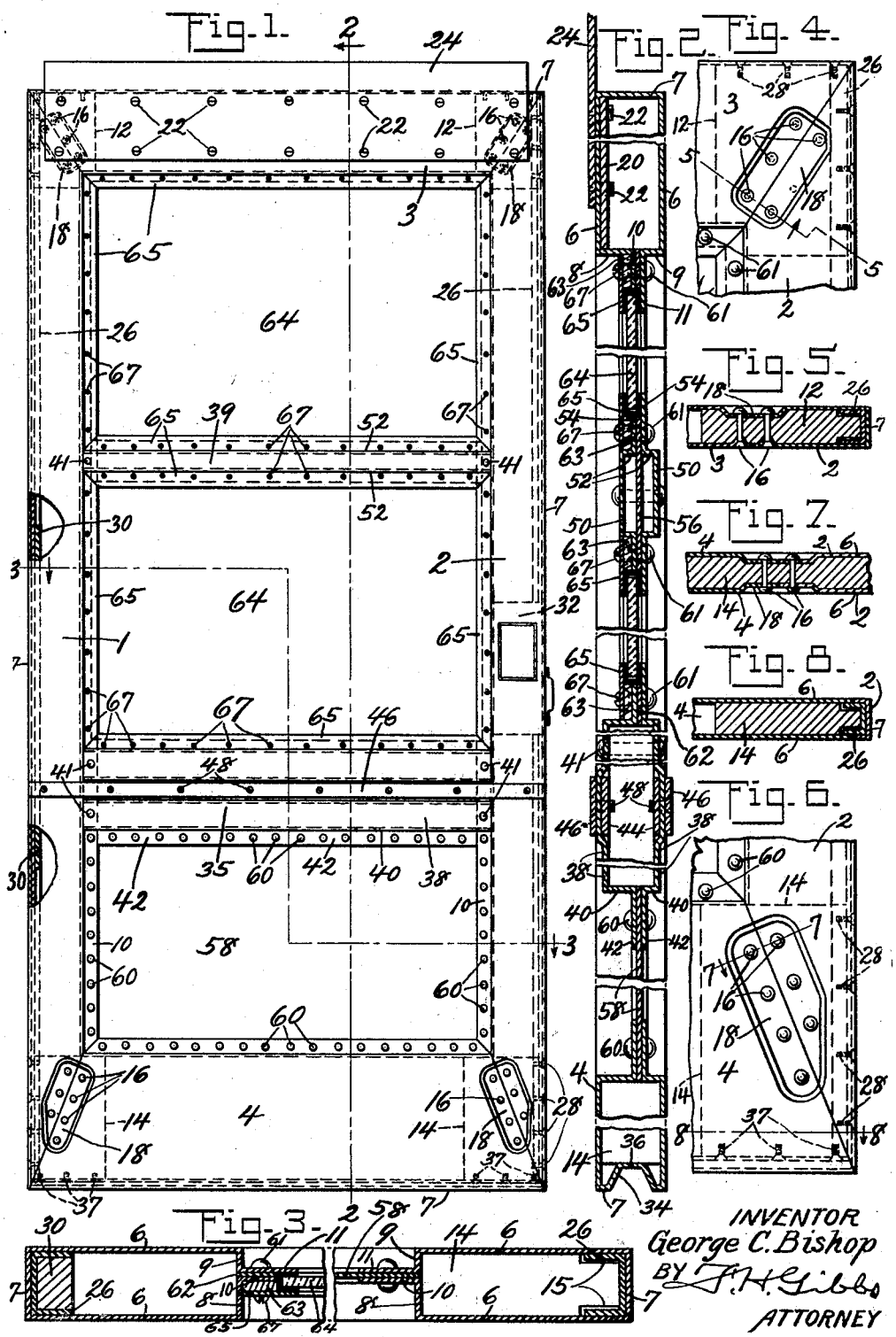
INVENTOR
George C. Bishop
BY F. H. Gibbs
ATTORNEY Patented Feb. 25, 1930

1,748,103

UNITED STATES PATENT OFFICE

GEORGE C. BISHOP, OF GARDEN CITY, NEW YORK

METAL DOOR

Application filed June 27, 1927. Serial No. 201,734.

Reference is had to the accompanying drawings which illustrate the preferred form of the invention; though it is to be understood that the invention is not limited to the exact details of construction shown and described, as it is obvious that various modifications thereof within the scope of the claims will occur to persons skilled in the art.

In said drawings:

Figure 1 is a plan view of a metal door constructed in accordance with this invention, parts being broken away to show other parts more clearly;

Fig. 2 is a broken vertical section taken on the line 2—2 of Fig. 1;

Fig. 3 is a broken horizontal section taken on the line 3—3 of Fig. 1;

Fig. 4 is a fragmentary view showing a corner formed by the top rail and one of the stiles;

Fig. 5 is a section taken on line 5—5 of Fig. 4;

Fig. 6 is a fragmentary view showing a corner formed by the bottom rail and one of the stiles; and Figs. 7 and 8 are sections taken on the lines 7—7 and 8—8 respectively, of Fig. 6.

It is an object of this invention to provide a metal door of simple and rugged construction which may be readily and economically manufactured.

As shown in the drawings, a door constructed in accordance with this invention comprises stiles 1 and 2, a top rail 3 and a bottom rail 4 each formed of a metal sheet or plate bent to a substantially rectangular shape and having side portions 6, outer edge portions 7 and inner edge portions 8 and 9, the inner edge portions 8 and 9 being provided with inwardly projecting flanges 10 and 11, respectively. At the corners formed by the stiles and rails, the stiles and rails are mitred and are secured together by welding along the seam and by means of filler or spacing blocks or castings 12 and 14 which are inserted in the corners and to which the stiles and rails are secured by rivets 16. The filler blocks 12 and 14 are formed with depressions 18 to which the stiles and rails are fitted so as to interlock therewith and in which the rivets 16 are placed, the filler blocks 12 used with the top rails being formed with depressions on one side only, the rivets 16 being countersunk on the opposite side to provide a smooth door surface. To one of the side portions 6 within the top rail 3 is secured a tap strip 20 which extends between the filler blocks 12 and is secured to the side portion 6 by screws 22, which screws 22 also secure to the outside of the side portion a hanger plate 24 which extends substantially the width of the door and projects beyond the outer edge portion of the top rail and to which the door hangers (not shown) are fastened.

The stiles 1 and 2 are reinforced by channels 26 which extend from the outer edge portion of the top rail 3 to the lower edges of the filler blocks 14 in the bottom rail 4, the edges of the filler blocks 12 and 14 being reduced in thickness as at 15 to permit the filler blocks to fit between the flanges of the channels 26. Screws 28 secure the filler blocks to the edge portions of the stiles and rails and to the channels. The stile 1 is further reinforced intermediate its ends by a tap strip 30 which is secured to the reinforcing channel 26 by screws (not shown) which also secure the door stop to the stile, while the channel 26 reinforcing the stile 2 is partly cut away to permit the insertion of the lock box 32.

The outer edge portion 7 of the bottom rail 2 is formed with an inwardly extending channel 34, which serves as a guide channel, and the web 36 of which engages with the bottom edge portions of the filler blocks 14 and is secured thereto by screws 37.

The stiles 1 and 2 are joined by intermediate rails 35 and 39, of which the lower one 35 comprises oppositely disposed channels having webs 38 and inwardly projecting flanges 40, the flanges 40 being provided with laterally outwardly projecting flanges 42. The flanges 42 are cut away so as to abut against the flanges 10 and 11 of the stiles while the webs 38 and flanges 40 abut against the inner edge portions of the stiles and are secured thereto by welding or any other suitable means. The rail 35 is also secured to the stiles by rivets 41 which pass through the webs 38, the flanges 10 and 11 of the stiles and filler blocks, which are placed between the webs 38 and the flanges 10 and 11. The webs 38 have outwardly pressed portions to the opposite sides of which tap strips 44 and wear strips 46 are secured by screws 48. The strips 46 overlap the side portions of the stiles 1 and 2 and are secured thereto while the strips 44 end at the stiles. The intermediate rail 39 comprises inwardly facing channels having webs 50 and flanges 52 which are provided with laterally outwardly projecting flanges 54 engaging the opposite sides of a filler strip 56. The rail 39 is secured to the stiles in the same manner as is the rail 35.

The lower panel comprises a metal plate 58 which is fitted between the flanges of the stiles and rails and secured thereto by the rivets 60. Between the flanges of the stiles above the panel 58, there are secured filler strips 62, and between the upper flanges of the intermediate rail 35 and the flanges of the rail 3 are also secured filler strips 62. These flanges and filler strips and the flanges and filler strip of rail 39 are secured together by rivets 61 and the rivets 61 also secure to the flanges tap strips 63. The intermediate and top rails and the upper portions of the stiles define a plurality of openings in which are mounted glass panels 64 held in position between glass retaining strips 65 secured to tap strips 63 by screws 67 and a flange of each of the stiles and rails forming the openings which extends beyond the other flange of the stile or rail and the filler and tap strips and forms a backing for each of the glass panels 64.

What is claimed is:

1. In a metal door, a rail comprising a plurality of oppositely disposed channel shaped members having laterally projecting flanges, a filler strip engaging all of said flanges and dividing said rail, tap strips and means securing said tap strips, filler strip and flanges together.

2. In combination, a frame member having spaced flanges, a filler strip between said flanges, a tap strip adjacent one of said flanges and means securing said strips and flanges together, said tap and filler strips and one of said flanges having alined edges forming a panel seat.

3. In combination, a hollow rectangular frame member having spaced flanges of different projections, a filler strip between said flanges, a tap strip adjacent one of said flanges and means securing said strips and flanges together, said tap and filler strips and one of said flanges having alined edges forming a panel seat and said other flange having the greater projection and serving as a panel backing strip.

4. In a metal door, stiles and rails having projecting flanges, said stiles and rails being united to form a rectangular frame with said flanges projecting inwardly, an intermediate rail having projecting flanges connecting said stiles, a panel secured between some of said flanges and filler strips secured between the remainder of said flanges, said intermediate rail being divided by one of said filler strips.

5. In a metal door, stiles and rails having projecting flanges, said stiles and rails being united to form a rectangular frame with said flanges projecting inwardly, an intermediate rail having projecting flanges connecting said stiles and a filler strip dividing said intermediate rail.

6. In a metal door, stiles and rails united to form a rectangular frame, an intermediate rail having flanges of different widths connecting said stiles and a filler strip dividing said intermediate rail and cooperating with some of said intermediate rail flanges to form panel seats.

In witness whereof I have hereunto set my hand.

GEORGE C. BISHOP.